3,155,714
DI(ALKYLGLYCOLYL) PHTHALATES
Robert H. Mills, Webster Groves, Mo., assignor to Monsanto Company, a corporation of Delaware
No Drawing. Filed May 4, 1959, Ser. No. 810,546
9 Claims. (Cl. 260—475)

This invention relates to novel di(alkyglycolyl) phthalates represented by the structure,

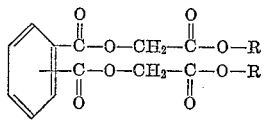

wherein R is an alkyl radical. These compounds are excellent plasticizers for polyvinyl chloride resins, nitrocellulose and acrylic resins.

The compounds of this invention are prepared by a novel, practical and commercially feasible method, which method involves heating a phthalic acid, a tertiary aliphatic amine and an alkyl haloacetate. Mort particularly, the method of this invention involves heating substantially two mols of a tertiary aliphatic amine and substantially two mols of an alkyl haloacetate per mol of a phthalic acid in the absence of free water. Although the presence of some free water will not render the process inoperative, it will cause a decrease in the maximum obtainable yield of product. A solvent can be employed as the reaction medium, however it is preferred to conduct the reaction without a solvent in order to obtain the maximum yield of product.

When the di(alkylglycolyl) phthalates to be prepared are derivatives of o-phthalic acid, molar quantities of phthalic anhydride and water can be used in place of o-phthalic acid with equivalent yield of product. Thus o-phthalic acid and a combination of equimolar quantities of phthalic anhydride and water are equivalents in the process of this invention, and whenever o-phthalic acid is referred to, either in the specification or claims, it is to be understood that substantially equimolar quantities of phthalic anhydride and water are considered equivalent to o-phthalic acid.

The alkyl haloacetate reactant used in the process of this invention can be represented by the structure,

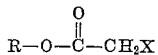

wherein R is an alkyl group and X is a halogen selected from chlorine, bromine and iodine, but preferably chlorine. The alkyl group can be straight or branched chain and can be derived from various sources, such as alcohols, including alcohols produced by the oxo synthesis or alcohols obtained by the catalytic dehydrogenation of coconut oil, from oxidized waxes, or from esterification of a carbonyl group by reaction with an olefin. Also, the alkyl group represented by R can have substituents, such as hydroxy, sulfonate, nitro and/or halogen, which do not interfere with the desired reaction. In the case of a halogen substituent, some reaction may take place; but, in general, the halogen denoted by X above is quite active due to its position so that the reaction is not diverted from replacement of X to replacement of halogen on the alkyl portion represented by R. Illustrative but non-limiting examples, of suitable alkyl haloacetates are methyl chloroacetate, ethyl chloroacetate, ethyl bromoacetate, n-propyl bromoacetate, isopropyl iodoacetate, n-butyl bromoacetate, tert.-butyl iodoacetate, amyl chloroacetate, n-hexyl chloroacetate, dimethyl butyl chloroacetate, n-heptyl chloroacetate, 2-methyl-3-ethyl pentyl chloroacetate, n-octyl bromoacetate, 2-methyl heptyl chloroacetate, 2-ethylhexyl chloroacetate, nonyl bromoacetate, n-decyl chloroacetate, dodecyl bromoacetate, tridecyl chloracetate, tridecyl iodoacetate, pentadecyl chloroacetate, octadecyl chloroacetate, etc.

Tertiary aliphatic amines suitable for use in the process of this invention can be represented by the structure,

wherein A, B and C are like or unlike aliphatic organic radicals. Preferably, A, B and C together have a total of three to twenty-four carbon atoms; it is also preferred that A, B and C be alkyl radicals. Non-limiting examples of such tertiary aliphatic amines are trimethylamine, triethylamine, tri-n-propylamine, triisopropylamine, tri-n-butylamine, triisoamylamine, trihexylamine, triethanolamine, methyldiethylamine, dimethylethylamine, methyldiethanolamine, dimethylcyclohexylamine, dimethylhexylamine, diethylhexylamine, dimethyldecylamine, and the like.

The method of preparation of the new compounds of this invention is shown in the following non-limiting examples. Parts are parts by weight unless otherwise stated.

EXAMPLE 1

Into a suitable closed reaction vessel capable of withstanding subatmospheric pressures and having an agitator and several openings suitable for addition of reactants there are charged 111.1 parts of phthalic anhydride and 13.9 parts of water. Thereafter, over a period of about 35 minutes, 15.9 parts of triethylamine and 324 parts of 2-ethylhexyl chloroacetate are added alternatively while the temperature is gradually increased to a maximum of about 145° C. The reaction mixture is then heated at 130–136° C. for an additional 15 minutes in order to insure completion of the reaction. The reaction mixture is then washed in succession twice with 160 ml. of water (the first wash being made acidic with HCl), washed with 60 ml. of a 20% sodium hydroxide solution and finally washed with 160 ml. of water. After steaming the washed reaction mixture at a temperature of 135–140° C. and a pressure of 20 mm. of mercury absolute, washing with aqueous sodium hydroxide and water, and drying the resulting liquid, there is obtained 337.7 parts of di(2-ethylhexylglycolyl) phthalate, having a specific gravity of 1.0647 and an index of refraction of 1.482. At an apparent boiling point of about 240° C. at 0.3 mm. of mercury absolute, the product began to decompose.

In a similar manner, other new compounds of my invention are prepared, examples of which are given below.

| Example Number | Compound | Boiling Point, °C. | Index of Refraction at 25° C. | Specific Gravity, 25° C./25°C |
|---|---|---|---|---|
| 2 | Di(ethylglycolyl) phthalate. | 209–210° C. at 1.8 mm. of Hg absolute. | 1.497 | (¹) |
| 3 | Di(butylglycolyl) phthalate. | 206–213° C. at 0.3 mm. of Hg absolute. | 1.488 | 1.1470 |
| 4 | Di(hexylglycolyl) phthalate. | | 1.484 | 1.0986 |
| 5 | Di(decylglycolyl) phthalate. | | 1.483 | 1.0416 |
| 6 | Di(tridecylglycolyl) phthalate. | | 1.481 | 1.0154 |

[1] White waxy solid, M.P., 44–46° C.

In addition to the compounds of Examples 1 to 6, my invention includes other di(alkylglycolyl) phthalates, such as, but not limited to, those wherein the alkyl portion is methyl, propyl, isopropyl, tert.-butyl, amyl, heptyl, octyl, nonyl, undecyl, dodecyl, pentadecyl, octadecyl, and the like.

The di(alkylglycolyl) phthalates of this invention have been found to be very efficacious plasticizers for polyvinyl chloride-containing resins in that plastic compositions resulting from plasticizing such resins with these compounds exhibit properties superior to the properties obtained with standard monomeric plasticizers, such as dioctyl phthalate and diisodecyl phthalate, even though they are also monomeric compounds. The procedures which were used to evaluate the compounds of this invention are as follows:

*Compatibility.*—Visual inspection of a plasticized composition is employed, incompatibility of the plasticizer with the polymer being demonstrated by cloudiness of the composition and exudation of the plasticizer.

*Low-temperature flexibility.* — Low-temperature flexibility is one of the most important properties of elastomeric polyvinyl chloride-containing compositions. While many plasticizers will produce flexible compositions at room temperature, the flexibility of these compositions at low temperature may vary considerably; e.g., plasticized polyvinyl chloride compositions that are flexible at room temperature often become very brittle and useless at low temperatures. Low-temperature flexibility tests herein employed are according to the well-known method of Clash and Berg, which method determines the torsional flexibility of a plastic composition at various temperatures. The temperature at which the vinyl composition exhibits an arbitrarily established minimum flexibility is defined as the Low-Temperature Flexibility of the composition. This value may also be defined as the lower temperature limit of the plasticized composition's usefulness as an elastomer.

*Volatility.*—Just as a decrease in temperature often results in decreased flexibility of the plasticized polymer composition, so does loss of plasticizer by volatilization cause decreased flexibility. Hence, plasticizers which are readily volatilized from the plasticized composition as a result of aging or heating are inefficient because, upon volatilization, the plasticizer compositions become stiff and hard. The test employed for plasticizer volatility is that described by the American Society for Testing Materials under the designation D–1203–55.

*Hydrocarbon extraction.*—The measurement of hydrocarbon extraction performed with kerosene as a typical liquid hydrocarbon is determined by submerging a weighed sample of a plasticized resin in kerosene at a constant temperature of 23° C. for a period of twenty-four hours. The sample is then placed in a circulating-air oven at 80° C. for four hours. The extraction of plasticizer resulting from contact with the kerosene is then determined by re-weighing the sample. The kerosene employed in this test has a boiling range of about 200° C. to 250° C., corresponding to an average chain length of thirteen carbon atoms.

In the table below are given the results observed when employing the aforedescribed procedures. In all cases the resin used was polyvinyl chloride.

| Ex. No. | Plasticizer | Volatility,[1] percent | Low-temperature[1] Flexibility, °C. | Hydrocarbon[1] Extraction, percent | Volatility,[2] percent | |
|---|---|---|---|---|---|---|
| | | | | | 1 Day | 6 Days |
| 7 | Di(butylglycolyl) phthalate. | 2.1 | −19.7 | 2.1 | 1.9 | 6.2 |
| 8 | Di(hexylglycolyl) phthalate. | 2.3 | −19.0 | 2.0 | | |
| 9 | Di(2-ethylhexylglycolyl) phthalate. | 1.4 | −22.5 | | 1.4 | 2.3 |
| 10 | Di(decylglycolyl) phthalate. | 1.7 | −22.2 | 0.2 | 1.4 | 2.6 |
| 11 | Di(tridecylglycolyl) phthalate. | | | | 1.8 | 3.2 |
| 12 | Dioctyl phthalate. | 4.5 | | 32 | 5.1 | 21.5 |
| 13 | Diisodecyl phthalate. | 1.6 | | 70 | 1.4 | 4.3 |

[1] Plasticizer concentration of 67 parts per 100 parts of resin.
[2] Plasticizer concentration of 50 parts per 100 parts of resin.

The data in the above table clearly show that the di(alkylglycolyl) phthalates of this invention, in which the alkyl radicals each contain four or more carbon atoms, are superior plasticizers for vinyl halide-containing resins when compared to presently used monomeric plasticizers such as dioctyl phthalate and diisodecyl phthalate.

The di(alkylglycolyl) phthalates, wherein the alkyl portion contains one to three carbon atoms, are not particularly suitable as plasticizers for vinyl halide-containing resins due to some incompatibility therewith; however, they are suitable for use as plasticizers for nitrocellulose and acrylic resins, as are the di(alkylglycolyl) phthalates wherein the alkyl groups each have four or more carbon atoms.

The term "vinyl chloride resin," as used herein, includes homopolymers of vinyl chloride and copolymers of vinyl chloride. Illustrative examples of vinyl chloride resins, in addition to polyvinyl chloride, are copolymers of vinyl chloride with vinyl acetate, methyl methacrylate, diethyl maleate, dibutyl maleate or vinylidene chloride. Preferably, such copolymers contain at least 85% by weight of combined vinyl chloride. When employing the compounds of this invention as plasticizers for vinyl chloride resins, they are used in a plasticizing amount, e.g., a concentration of from about 20 parts by weight to about 300 parts by weight per 100 parts of vinyl chloride resin. Generally, where the ultimate use of a plasticized vinyl chloride composition is as a free film such as is used for wrapping, raincoats, shower curtains, etc., about 40 parts to about 60 parts by weight of the compounds of this invention are used per 100 parts of vinyl chloride resin.

Acrylic resins are being used for surface coatings in constantly-increasing amounts because of their durability, ease of application, lack of odor and speed of drying. Thus, acrylic resins are used to provide emulsion paints, masonry coatings and automotive finishes. A thermosetting acrylic-base coating is used for appliances. Generally, acrylic resins provide hard, brittle coatings which are susceptible to cracking under impact and which often lack desired adhesive qualities. Also, the usual acrylic resin coating is quite vulnerable to attack from aromatic hydrocarbons, chlorinated hydrocarbons and esters.

For most surface coating operations, whether by brushing or spraying, acrylic resins dissolved in organic solvents are used. By changing the resin, various qualities of the coating, such as hardness and durability, can be altered. Another method of modifying the qualities of an acrylic resin coating is to incorporate a plasticizer for the resin into the resin solution prior to coating a surface. By so doing, the hardness of the ultimate coating can be reduced, the tendency to peel can be reduced, or increased solvent resistance can be provided. Most commercial plasticizers today do not improve all of these desirable properties in the ultimate coating, but only affect some of these properties.

It has now been found that the di(alkylglycolyl) phthalates of this invention are excellent plasticizers for acrylic resins, especially when such resins are used to provide surface coatings, since they improve all of the properties just mentioned, especially adhesiveness or resistance to peeling. Thus the di(alkylglycolyl) phthalates of this invention, when added to acrylic resins in plasticizing amounts, provide surface coatings having greatly improved impact resistance, increased resistance to solvent attack and greater adhesiveness. Furthermore, the di(alkylglycolyl) phthalates of this invention, due to their low volatility, provide these desired properties for a period of time greatly exceeding what is obtained with present commercial acrylic resin plasticizers.

The amount of the di(alkylglycolyl) phthalates of this invention used to plasticize acrylic resins can vary considerably, depending upon such factors as the specific acrylic resin used and ultimate properties desired. Accordingly, the amount used is a plasticizing amount determinable by a consideration of many factors. Thus, for example, in the case of acrylic resin solutions, commonly known as lacquers, which basically are solvent solutions of the resin, from about 10 to 35 parts by weight of the compounds of this invention per 100 parts of resin are used. However, anywhere from about 10 parts to about 100 parts by weight per 100 parts of resin can be used, depending upon the form of the resin and the intended use thereof.

The term "acrylic resin," as used herein, is meant to include the polymers of acrylic acid, methacrylic acid and other acrylic acids, and esters and substituted derivatives thereof which can be derived from such monomeric compounds as acrylic acid, methacrylic acid, ethacrylic acid, sodium methacrylate, ammonium acrylate, methyl, ethyl, butyl, 2-ethylbutyl, 2-ethylhexyl, octyl, methoxyethyl, ethoxyethyl, 3-ethoxypropyl and 2-diethylaminoethyl acrylates, methyl, ethyl, propyl, butyl, hexyl, decyl-octyl, lauryl, stearyl, 2-dimethylaminoethyl and diethylaminoethyl methacrylates and methyl alpha-chloroacrylate, and copolymers of such monomers with other ethylenically-unsaturated monomers which are copolymerizable therewith, such as, for example, substituted derivatives of acrylic acid and methacrylic acid, as the nitriles, amides and alpha-halogenated esters, and physical blends of such polymers and copolymers.

In order to demonstrate the outstanding plasticizing ability of the compounds of this invention for acrylic resins, various commercially used plasticizers and compounds of this invention were added to the toluene solutions of polymethylmethacrylate, and surface coatings made from such resin solutions were compared utilizing the following tests.

*High-humidity environment.*—Plasticized films are cast on tin panels, dried, and the plates placed in beakers partially filled with water. The beakers are then covered and placed in an oven maintained at 40° C. Periodically thereafter the surface of the panels above the water line is inspected and any effects upon the surface noted.

*Solvent crazing.*—Tin panels are coated with the acrylic resin solution, and the resulting film is allowed to dry. The panels are then immersed in toluene for three-minute intervals, removed and dried. After each immersion, the surface of the panels is inspected for evidence of checking or crazing.

*Overlayer checking.*—Evidence of resistance to overlayer checking, that is, checking of a previous coating when a new coating is applied which is caused by the solvent in the new coat, is determined by coating a tin panel with an acrylic resin solution, drying the coating, and recoating the panel. Any evidence of checking or staining in the first coat is noted.

*Volatility from films.*—The volatility of a plasticizer from a film of an acrylic coating is determined by coating a weighed tin panel with the test solution, drying the coating and then placing the panel in an oven maintained at 100° C. for twenty-four hours. Thereafter the panel is cooled and weighed, and any loss in weight is calculated as the percent of plasticizer lost.

The results observed, using the above tests, were as follows:

| Compound | High-Humidity Environment | Solvent Crazing | Overlayer Checking | Volatility From Films |
|---|---|---|---|---|
| Di(2-ethylhexylglycolyl) o-phthalate. | No effect after two months. | Noticeable effect after nine months. | None | None. |
| Butyl benzyl o-phthalate. | Slight peeling after two months. | Noticeable effect after six months. | Slight | 54.6%. |

Other modes of applying the principles of this invention will be apparent to those skilled in the art. Accordingly, while this invention has been described with reference to various specific examples and embodiments, it is to be understood that the invention is not limited thereto and that it can be variously practiced within the scope of the following claims.

What is claimed is:

1. In a method of making di(alkylglycolyl) phthalates, the step comprising reacting (a) a phthalic acid, (b) a saturated tertiary aliphatic amine having a total of 3 to 24 carbon atoms, and (c) an alkyl haloacetate having from 1 to about 18 carbon atoms in the alkyl group, the mol ratio of (a):(b):(c) being about 1:2:2.

2. In a method of making di(alkylglycolyl) phthalates, the step comprising reacting (a) o-phthalic acid, (b) a saturated tertiary aliphatic amine having a total of 3 to 24 carbon atoms, and (c) an alkyl haloacetate having from 1 to about 18 carbon atoms in the alkyl group, the mol ratio of (a):(b):(c) being about 1:2:2.

3. In a method of making di(alkylglycolyl) phthalates, the step comprising reacting (a) phthalic anhydride (b) a saturated tertiary aliphatic amine having a total of 3 to 24 carbon atoms, (c) and alkyl haloacetate having from 1 to about 18 carbon atoms in the alkyl group, and (d) water, the mol ratio of (a):(b):(c):(d) being about 1:2:2:1.

4. Claim 2 where the tertiary aliphatic amine is a trialkyl and the alkyl haloacetate is an alkyl chloroacetate.

5. Claim 3 where the tertiary aliphatic amine is a trialkylamine and the alkyl haloacetate is an alkyl chloroacetate.

6. Claim 4 where the trialkylamine is triethylamine.

7. Claim 5 where the trialkylamine is triethylamine.

8. In a method of making di(2-ethylhexylglycolyl) o-phthalate, the step comprising reacting (a) o-phthalic acid, (b) triethylamine, and (c) 2-ethylhexyl chloroacetate, the mol ratio of (a):(b):(c) being about 1:2:2.

9. In a method of making di(decylglycolyl) o-phthalate, the step comprising reacting (a) o-phthalic acid, (b) triethylamine, and (c) decyl chloroacetate, the mol ratio of (a):(b):(c) being about 1:2:2.

References Cited in the file of this patent

UNITED STATES PATENTS

| | | |
|---|---|---|
| 2,072,739 | Dykstra et al. | March 2, 1937 |
| 2,120,755 | Kyrides | June 14, 1938 |
| 2,449,990 | Gresham et al. | Sept. 28, 1948 |
| 2,530,852 | Bixby | Nov. 21, 1950 |
| 2,712,025 | Rehberg et al. | June 28, 1955 |

OTHER REFERENCES

Groggins: Unit Processes in Organic Synthesis, Fourth Edition, McGraw-Hill, 1952, page 622.

Noller: Textbook of Organic Chemistry, Saunders Co., Philadelphia, Pa., 1953, page 414.

Peterson et al.: Industrial and Engineering Chemistry, vol. 49, No. 9, Part II, September 1957, pages 1485–1490.